(12) United States Patent
Gjestrum et al.

(10) Patent No.: US 6,498,768 B1
(45) Date of Patent: Dec. 24, 2002

(54) METHOD AND APPARATUS FOR MARINE SEISMIC SURVEYING INCLUDING MULTIPLES STREAMERS FROM A LEAD-IN

(75) Inventors: Einar Gjestrum, Rykkin (NO); Martin Howlid, Gjettum (NO); Gordon Lane McDaniel, Sidney, TX (US)

(73) Assignee: Schlumberger Technology Corporation, Houston, TX (US)

( * ) Notice: Subject to any disclaimer, the term of this patent is extended or adjusted under 35 U.S.C. 154(b) by 0 days.

(21) Appl. No.: 09/508,647

(22) PCT Filed: Sep. 17, 1998

(86) PCT No.: PCT/IB98/01435

§ 371 (c)(1),
(2), (4) Date: May 30, 2000

(87) PCT Pub. No.: WO99/15913

PCT Pub. Date: Apr. 1, 1999

(30) Foreign Application Priority Data

Sep. 2, 1997 (GB) ............................................. 9819169
Sep. 19, 1997 (US) ........................................ 60/160,705

(51) Int. Cl.[7] ................................................. G01V 1/38
(52) U.S. Cl. ........................................... 367/20; 367/16
(58) Field of Search ............................. 367/14, 15, 16, 367/17, 18, 19, 20, 106, 130, 177; 340/854.7, 854.9, 855.1, 855.2; 114/242, 243, 253

(56) References Cited

U.S. PATENT DOCUMENTS

| 5,408,947 A | * | 4/1995 | Curto et al. ................ 114/253 |
| 5,835,450 A | * | 11/1998 | Russell ........................ 367/20 |
| 5,913,280 A | | 6/1999 | Nielsen et al. .............. 114/242 |
| 6,074,253 A | * | 6/2000 | Brinchmann-Hansen .... 439/624 |

* cited by examiner

*Primary Examiner*—Edward Lefkowitz
*Assistant Examiner*—Anthony Gutierrez
(74) *Attorney, Agent, or Firm*—David S. Figatner; Williams, Morgan & Amerson, P.C.

(57) ABSTRACT

A marine seismic surveying method and apparatus are shown. The apparatus includes at least one lead-in which has two or more of the streamers connected to be towed thereby, and which comprises a load-bearing outer sheath to bear the towing forces, an electrical or electro-optical core via which control signals and electrical power are supplied to, and data signals are received from, the steamers being towed by the lead-in, and a connector device series connected in the lead-in, the connector device comprising a body member mechanically coupled between the respective portions of the load-bearing outer sheath of the lead-in on either side thereof, to transmit towing forces therebetween, and a towing attachment for mechanical connection to one of the two or more streamers.

23 Claims, 6 Drawing Sheets

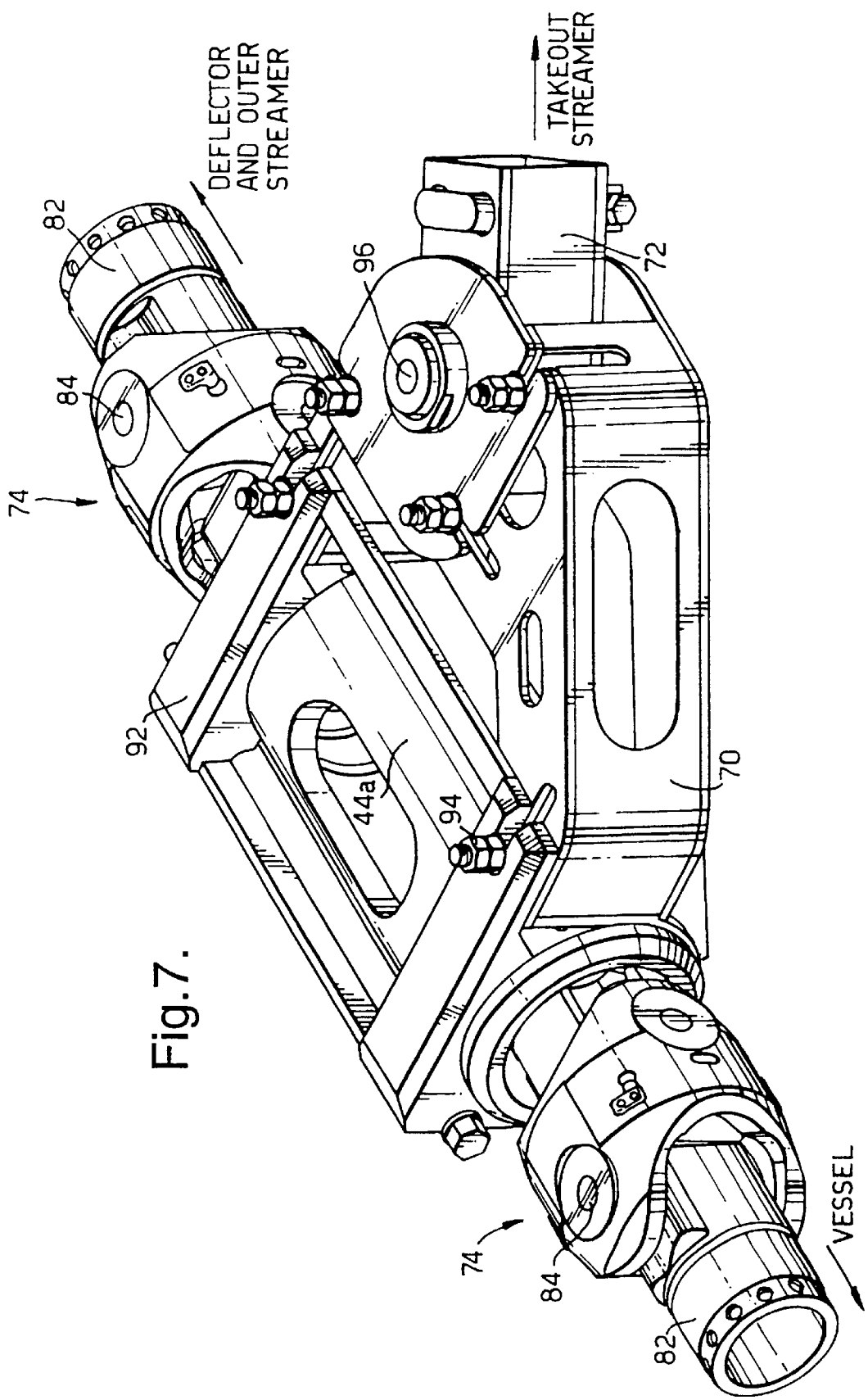

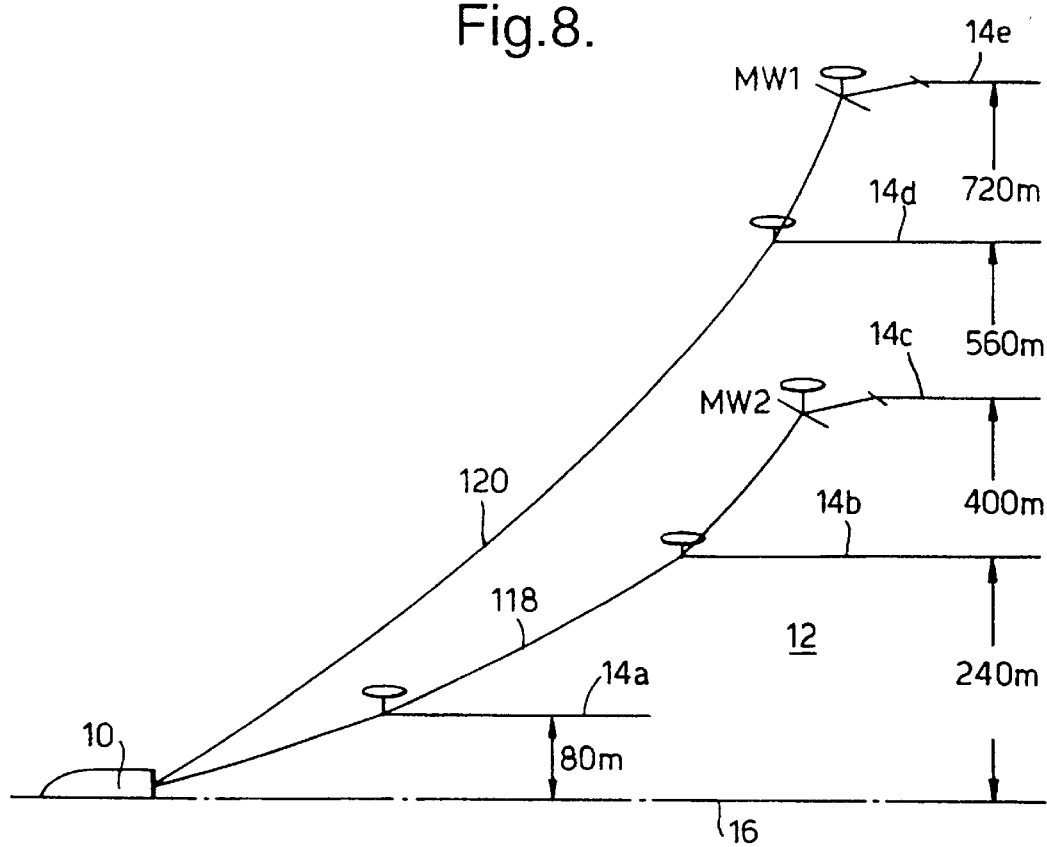

METHOD AND APPARATUS FOR MARINE SEISMIC SURVEYING INCLUDING MULTIPLES STREAMERS FROM A LEAD-IN

FIELD OF THE INVENTION

This invention relates to marine seismic surveying.

In order to perform a 3D marine seismic survey, a plurality of seismic streamers, each typically several thousand meters long and containing arrays of hydrophones and associated electronic equipment distributed along its length, are towed at about 5 knots behind a seismic survey vessel, which also tows one or more seismic sources, typically air guns. Acoustic signals produced by the seismic sources are directed down through the water into the earth beneath, where they are reflected from the various strata. The reflected signals are received by the hydrophones in the streamers, digitised and then transmitted to the seismic survey vessel, where they are recorded and at least partially processed with the ultimate aim of building up a representation of the earth strata in the area being surveyed.

The Applicant's current method of towing arrays of such streamers involves towing each streamer by means of its lead-in, ie by means of the armoured electrical or electro-optical cable that supplies control signals and electrical power to, and receives the aforementioned digitised signals from, the streamer, as described in U.S. Pat. No. 4,798,156, the armoured outer sheath of the lead-in, typically made of steel wires or high strength synthetic fibers such as Kevlar, serving to bear the towing forces. Using this method, the Applicant can typically tow a 700 meter wide array of eight streamers, each 4,000 meters long.

DESCRIPTION OF RELATED ART

The drag produced by such an array at the typical towing speed of 5 knots is about 40–45 tonnes, a high proportion of which is cross-line drag due to the transversely extending lead-ins rather than the in-line drag of the streamers themselves. This drag is a very significant contributory factor to the operating costs, primarily fuel costs, of the towing vessel, and therefore to the overall cost of the survey.

In order to increase the efficiency and reduce the cost of marine seismic surveys, it is desirable to use even wider arrays containing even more streamers. However, the Applicant has calculated that using its current towing technique, a 1440 meter wide array of ten streamers would produce a drag of over 70 tonnes, which is excessive, and therefore uneconomic.

It is an object of the present invention in its principal aspects to alleviate this problem.

The lead-ins, which because of their combined signal and power transmission and towing functions are rather expensive, are sometimes damaged in use, eg by shark bites or by impacts with debris. Currently, it is difficult if not almost impossible to repair a damaged lead-in, especially while at sea. It is an object of the present invention in its final aspect to provide solution to this problem.

SUMMARY OF THE INVENTION

According to a first aspect of the present invention, there is provided a method of performing a marine seismic survey with an array of seismic streamers towed behind a survey vessel, wherein two or more of the streamers are towed from a single lead-in which comprises a load-bearing outer sheath to bear the towing forces, an electrical or electro-optical core via which control signals and electrical power are supplied to, and data signals are received from, the streamers being towed by the lead-in, and a connector device series connected in the lead-in, the connector device comprising a body member mechanically coupled between the respective portions of the load-bearing outer sheath of the lead-in on either side thereof, to transmit towing forces therebetween, and a towing attachment for mechanical connection to one of the two or more streamers.

According to a second aspect of the invention, there is provided an array of seismic streamers adapted to be towed behind a survey vessel, the array comprising at least one lead-in which has two or more of the streamers connected to be towed thereby, and which comprises a load-bearing outer sheath to bear the towing forces, an electrical or electro-optical core via which control signals and electrical power are supplied to, and data signals are received from, the streamers being towed by the lead-in, and a connector device series connected in the lead-in, the connector device comprising a body member mechanically coupled between the respective portions of the load-bearing outer sheath of the lead-in on either side thereof, to transmit towing forces therebetween, and a towing attachment for mechanical connection to one of the two or more streamers.

In a preferred implementation of the invention, the array comprises 2N streamers, where N is at least 2, the streamers are substantially uniformly spaced apart and symmetrically distributed on each side of the centre line of the vessel, and at least two streamers on each side of the centre line of the vessel are towed from a respective such lead-in.

The Applicant has found that by use of selected implementations of the method of the invention, the drag produced by the aforementioned 1440 meter wide ten streamer array can be reduced from over 70 tonnes to a level in the region of 50 tonnes.

The load-bearing outer sheath of the or each such lead-in is preferably made from high strength synthetic fibers, such as Kevlar fibres.

Preferably, the inner core of the lead-in at each end of the or each connector device is terminated in a respective watertight termination, and the connector device includes elongate flexible electrical or electro-optical connector means for establishing electrical or electro-optical connection between said watertight terminations and between one of said terminations and the streamer connected to the towing attachment.

Conveniently, the inner core of the part of the lead-in on the vessel side of each connector includes separate electrical conductors or optical fibres for the control and data signals of each streamer connected directly or indirectly to that part via that connector.

According to a third aspect of the present invention, there is provided a connector device adapted for series connection in a lead-in to permit the lead-in to tow at least two seismic streamers, the lead-in comprising a load-bearing outer sheath, to bear the towing forces, and an electrical or electro-optical core via which control signals and electrical power are supplied to, and data signals are received from, the streamers, the connector device comprising a body member adapted to be mechanically coupled between the respective portions of the load-bearing outer sheath of the lead-in on either side of the body member, to transmit towing forces therebetween, and a towing attachment for mechanical connection to one of the two or more streamers, said towing attachment being secured to the body member.

The or each body member may advantageously comprise at least two generally tubular portions interconnected by a universal joint, the towing attachment being secured to one of the tubular body portions.

In a preferred implementation of the invention, the or each body member comprises three tubular body portions interconnected by two universal joints, the towing attachment being secured to the middle one of tubular body portions.

The or each towing attachment preferably includes clamping means for detachably clamping it to the tubular body portion to which it is secured.

Advantageously, the or each towing attachment ha s a towing bracket pivotally connected to it, said towing bracket being pivotal about an axis generally perpendicular to the axis of the body member.

According to a final aspect of the present invention, there is provided a connector device adapted for series connection in a lead-in used for towing a streamer, the lead-in comprising a load bearing outer sheath to bear the towing forces, and an electrical or electro-optical core via which control signals and electrical power are supplied to, and data signals are received from, the streamer, the connector device comprising a tubular body member which is adapted to be mechanically coupled between the respective portions of the load-bearing outer sheath of the lead-in on either side of the body member, to transmit towing forces therebetween, and which preferably comprises at least two generally tubular portions interconnected by a universal joint.

Preferably, the or each universal joint of the or each body member is a Cardan-type universal joint.

In all aspects of the invention, at least part of the or each body member is preferably made from titanium.

The invention will now be described, by way of example only, with reference to the accompanying drawings, of which:

BRIEF DESCRIPTION OF THE DRAWINGS

FIGS. 6 and 7 are respective perspective views of a towing attachment for fitment to the body member of FIG. 4, and of the towing attachment actually fitted to the body member of FIG. 4; and FIG. 8 is a schematic representation of a further embodiment of a seismic streamer array in accordance with the present invention.

Figure 1:
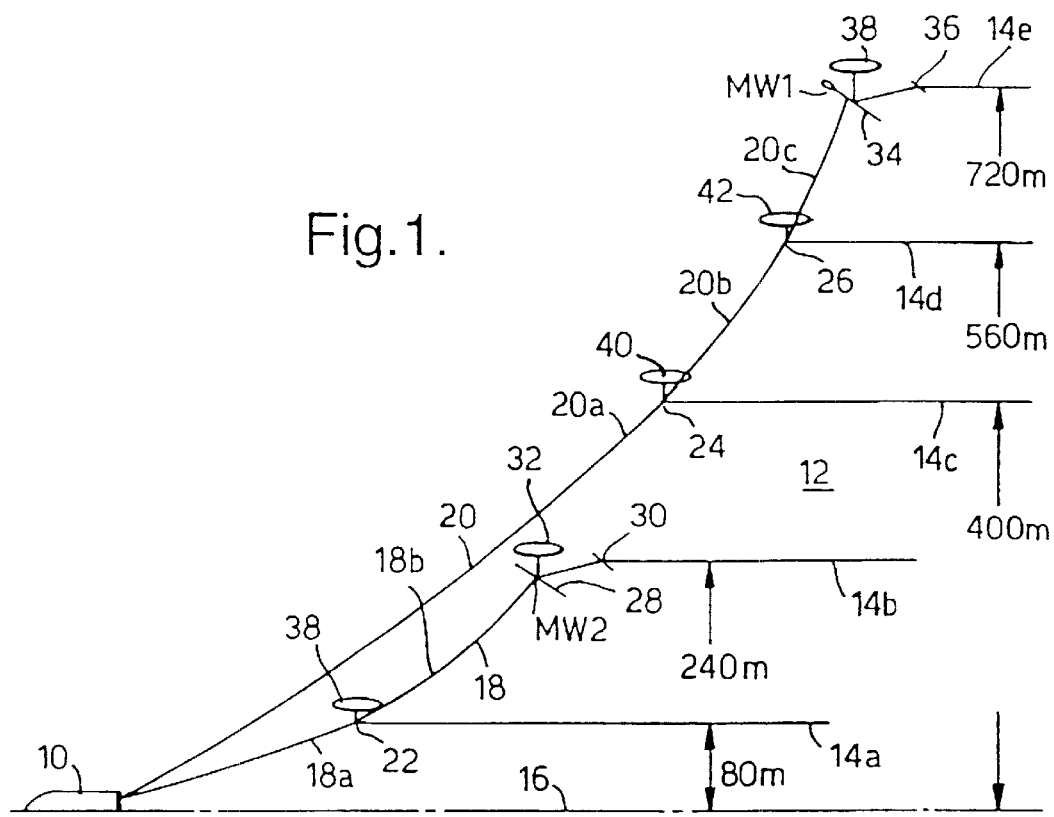
FIG. 1 is a schematic representation of a seismic survey vessel towing an array of seismic streamers in accordance with a first implementation of the invention.

The seismic survey vessel of FIG. 1 is indicated at 10, and is shown towing an array 12 of seismic streamers 14. Although the array contains ten of the streamers 14, symmetrically distributed five on each side of the centre line 16 of the vessel 10, only the five streamers on the starboard side of the vessel are shown in FIG. 1 for the sake of simplicity: It will be appreciated that the arrangement of the five streamers on the port side of the vessel is an exact mirror image of the arrangement shown in FIG. 1. The streamers 14 are uniformly spaced apart with a 160 meter spacing, giving the array 12 an overall width of 1440 meters, and are each typically 4000 meters long.

DETAILED DESCRIPTION OF THE DRAWINGS

As is well known, each of the streamers 14 contains a large number of longitudinally distributed hydrophones, groups of which are interspersed with associated electronics modules. Additionally, each streamer 14 is also provided with longitudinally distributed depth-controlling devices known as "birds" and acoustic position sensing devices. Further, the forward ends of the streamers 14 include so-called "stretch" sections for noise reduction. Since none of these is directly relevant to the present invention, and thus can take any convenient form, they are not shown in FIG. 1, nor will they be described in any further detail.

In accordance with the present invention, the two inner streamers 14a and 14b are towed by means of a single lead-in 18 common to both of them, while the three outer streamers 14c, 14d and 14e are towed by a single lead-in 20 common to all three of them. To facilitate this, the lead-in 18 is provided, intermediate its ends, with a connector device 22 to which the streamer 14a is connected, while the lead-in 20 is provided, intermediate its ends, with two spaced connector devices 24, 26 to which the streamers 14c and 14d respectively are connected. The connector devices 22, 24, 26 are all basically similar, and one of them will be described in more detail hereinafter.

The lateral distance between the center-line 16 of the vessel 10 and the end of the lead-in 18 remote from the vessel is controlled by a MONOWING deflector 28 and auxiliary deflector wing 30 of the types described in U.S. Pat. No. 5,357,892, the deflector 28 being suspended at the desired depth beneath the surface of the water from a float 32, as also described in U.S. Pat. No. 5,357,892. Similarly, the lateral distance between the center-line 16 of the vessel 10 and the end of the lead-in 20 remote from the vessel is controlled by a MONOWING deflector 34 and its auxiliary deflector wing 36, the deflector 34 being suspended from a float 38.

In dependence upon the weight of the lead-ins 18, 20, they may be supported at the desired depth beneath the surface of the water from respective floats 38, 40, 42. Although these floats are shown for simplicity as being coupled to the connector devices, they would in practice be located in between the connector devices, to avoid coupling movements due to surface waves to the connector devices.

The desired streamer spacing of 160 meters is determined by the selection of the respective lengths of the lead-ins 18 and 20 and the respective positions of the connector devices 22, 24, 26 along them.

Figure 2:
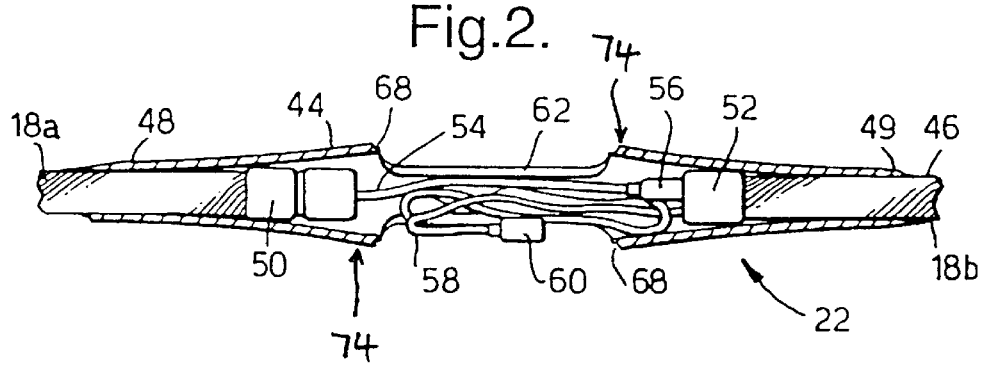
FIG. 2 is a somewhat schematic, part-sectional representation of part of a connector device used in forming the array of FIG. 1.
Figure 3:
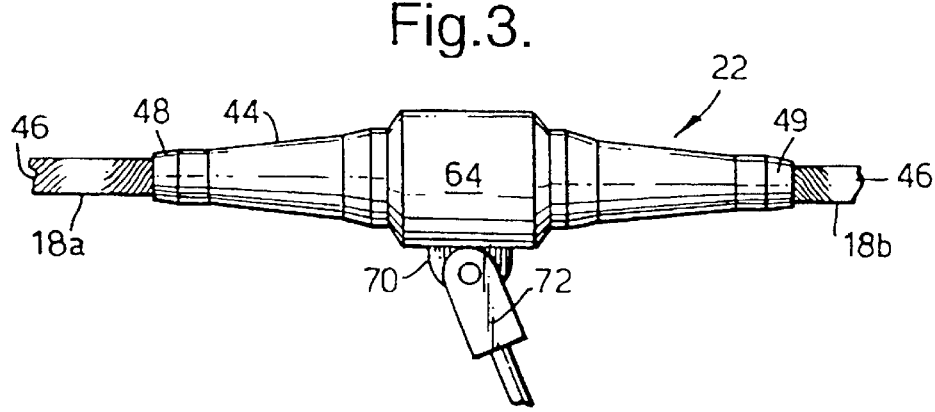
FIG. 3 is a schematic representation of the connector device of FIG. 2.

The connector device 22 is shown in FIGS. 2 and 3, and comprises an elongate generally tubular body member 44, which is adapted to be coaxially connected between two separate parts 18a and 18b of the lead-in 18. As is conventional, the lead-in 18 comprises an armoured outer sheath 46 composed of layers of woven steel wire, surrounding an inner core comprising electrical conductors for conducting electrical power and control signals to the streamers 14a and 14b, and for receiving data signals from those streamers. The opposite ends 48, 49 of the body member 44, which is typically made of stainless steel or titanium, are sealingly secured around the outside of the outer sheath 46 using cone-shaped armour clamps or resin sockets in known manner, while the respective ends of the parts 18a and 18b within the body member 44 are terminated in respective watertight cable terminations 50, 52.

Within the cable termination 50, the core conductors are connected to a short flexible jumper cable 54, which terminates in a connector 56. The connector 56 plugs into the cable termination 52, to provide connection between those inner core conductors of the lead-in part 18a which are associated with the streamer 14b. Additionally, the connector 56 is provided with a long flexible jumper cable 58, which terminates in a connector 60. The connector 60 plugs into a watertight cable termination (not shown) associated with the streamer 14a, to provide connection between those inner core conductors of the lead-in part 18a which are associated with the streamer 14a. The central portion of the body member 44 is provided with one or more slots 62, through one of which the jumper cable 58 and its connector 60 are passed en route to connection to the streamer 14a. The jumper cable 58 is folded up in the interior of the body member when the connector device 22 is stored, as will become apparent hereinafter.

As an alternative to the arrangement of the preceding paragraph, the short and long flexible jumper cables 54, 58 can both be connected to the relevant core conductors within the cable termination 50. In a still further alternative, the jumper cables 54, 58 can be replaced by a Y-shaped cable having the connectors 56 and 58 at the ends of the two prongs of the Y-shape, and a connector at the base of the Y-shape which co-operates with a connector in the termination 50.

It will be appreciated from the description of the preceding two paragraphs that the lead-in part 18a contains more core conductors than the lead-in part 18b, in that the former includes core conductors associated with both of the streamers 14a and 14b: in practice, typically only the conductors for data signals are duplicated. This has the result that the lead-in part 18a is slightly larger in diameter than the lead-in part 14b, but the difference is fairly small and the increase in drag due to the increased diameter is also fairly small.

As shown in FIG. 3, the connector device 22 further comprises a towing attachment based upon a hollow clamping member 64. The clamping member 64 is detachably secured around the central portion of the tubular body member 44 containing the slots 62, and is split parallel to the plane of FIG. 3 into two halves to facilitate its attachment to and removal from the body member 44.

The opposite open ends of the clamping member 64 are rotatably supported in circumferential tracks 68 formed around the central portion of the body member 44, so that the clamping member can rotate to some extent around the body member: however, this rotation capability is not essential, as will become apparent hereinafter. Additionally, a lug 70 projects radially from one side of the clamping member 64, and a towing bracket 72 is pivotally connected to this lug so as to pivot about axis perpendicular to the axis of the clamping member (ie it pivots about an axis which is substantially vertical in use). It will be appreciated that the streamer 14a is mechanically coupled to the towing bracket 72.

In use, the lead-ins 18 and 20 are initially stored on respective large storage drums (not shown) on the vessel 10, along with the tubular body members 44 of their respective connector devices 22 (for the streamer 18) and 24, 26 (for the streamer 20) and possibly their respective outer streamers 14b and 14e, while the streamers 14a, 14c and 14d, not yet connected to the connector devices 22, are also stored on respective drums on the vessel. At this point, the jumper cables 58 of each of the connector devices 22, 24, 26 are folded up inside the body member 44 of their respective connector devices, as mentioned earlier.

To facilitate the storage of the lead-ins 18, 20 on storage drums having a diameter as low as 2 meters without removing the tubular body members 44, the latter can be provided with at least one, and preferably two, universal joints, to give them a limited amount of flexibility. An alternative embodiment of the connector device 22, incorporating such universal joints, will now be described in more detail with reference to FIGS. 4 to 7.

Figure 4:
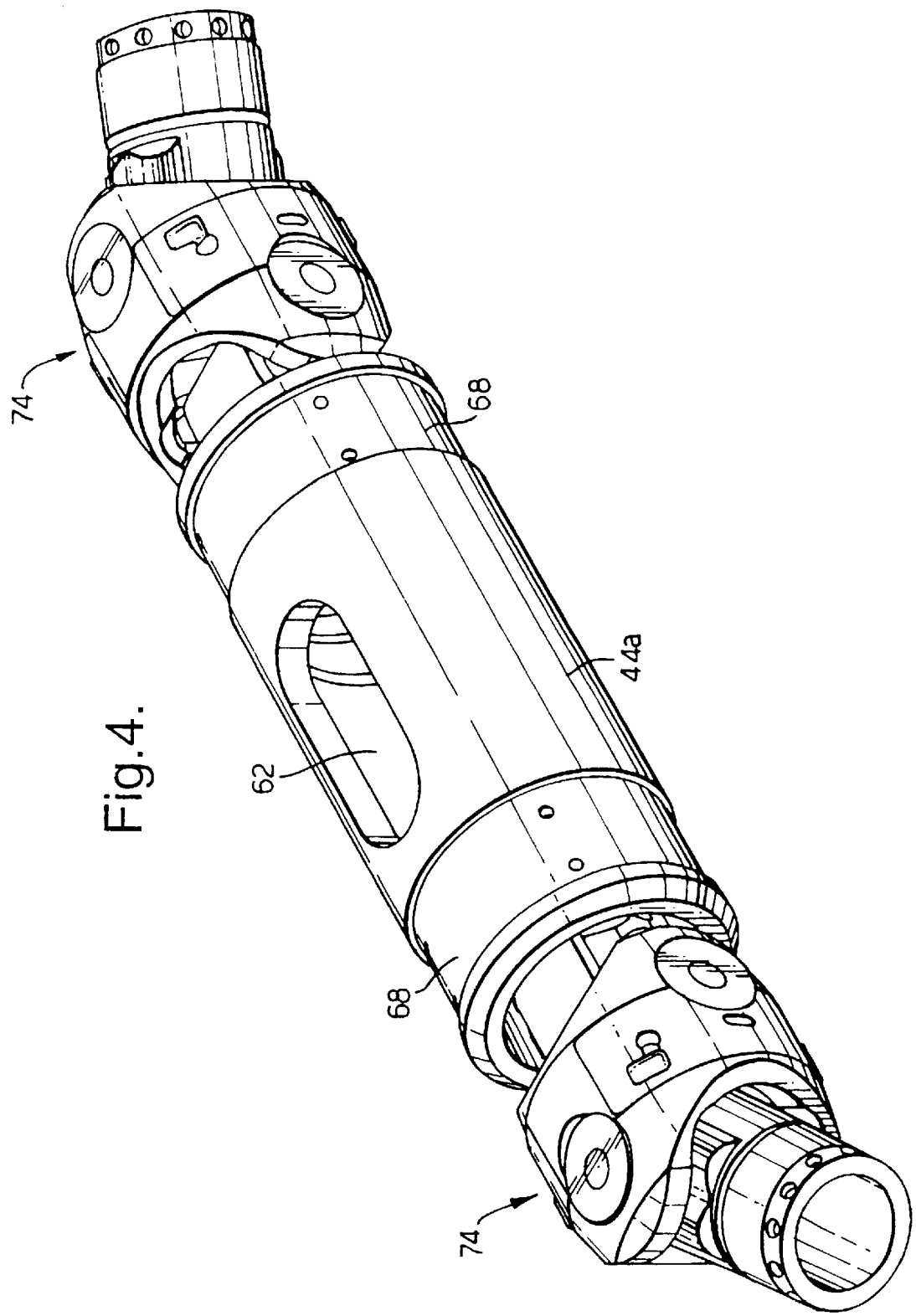
FIG. 4 is a more detailed perspective view of some of the principal mechanical components of the body member of an alternative embodiment of the connector device of FIGS. 2 and 3.

FIG. 4 shows, at 44a, the central portion of the tubular body member 44 of the connector device 22 (ie the portion which contains the slots 62 and to which the clamping member 64 is detachably secured), together with the aforementioned universal joints, indicated at 74, by which the central portion 44a is connected to respective end portions loosely equivalent to the end portions 48 and 49 shown in FIGS. 2 and 3.

Figure 5:
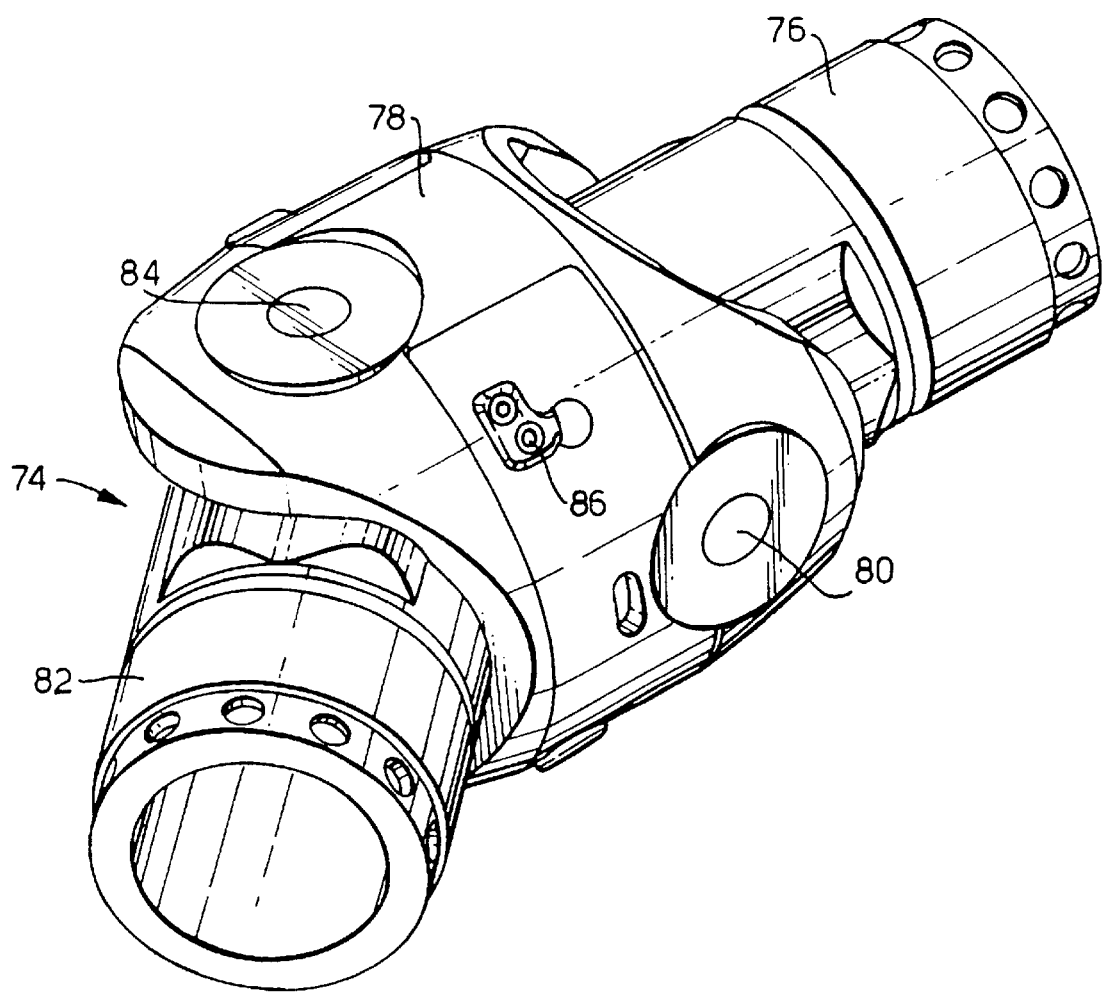
FIG. 5 is an enlarged perspective view of one of the components illustrated in FIG. 4.

An enlarged view of one of the universal joints 74 is provided by FIG. 5, where it can be seen that the universal joint is of the Cardan type, and comprises a first short tubular piece 76, of which one end is adapted to be secured within one open end of the central portion 44a of the body member 44, and the other end is pivotally secured within one open end of a hollow two-part universal joint housing 78 by means of a pin 80 extending through the housing and diametrically of the piece 76. A second short tubular piece 82 has one end similarly pivotally secured within the other open end of the hollow housing 78 by means of a pin 84 extending at right angles to the pin 80, and its other end adapted to be secured within the open end of one of the end portions 48 or 49 of the body member 44. Set screws 86 pass through the housing 78 into engagement with respective ones of the pins 80, 84 to secure the pins in the housing and ensure that the pins hold the two pieces of the housing together.

Figure 6:
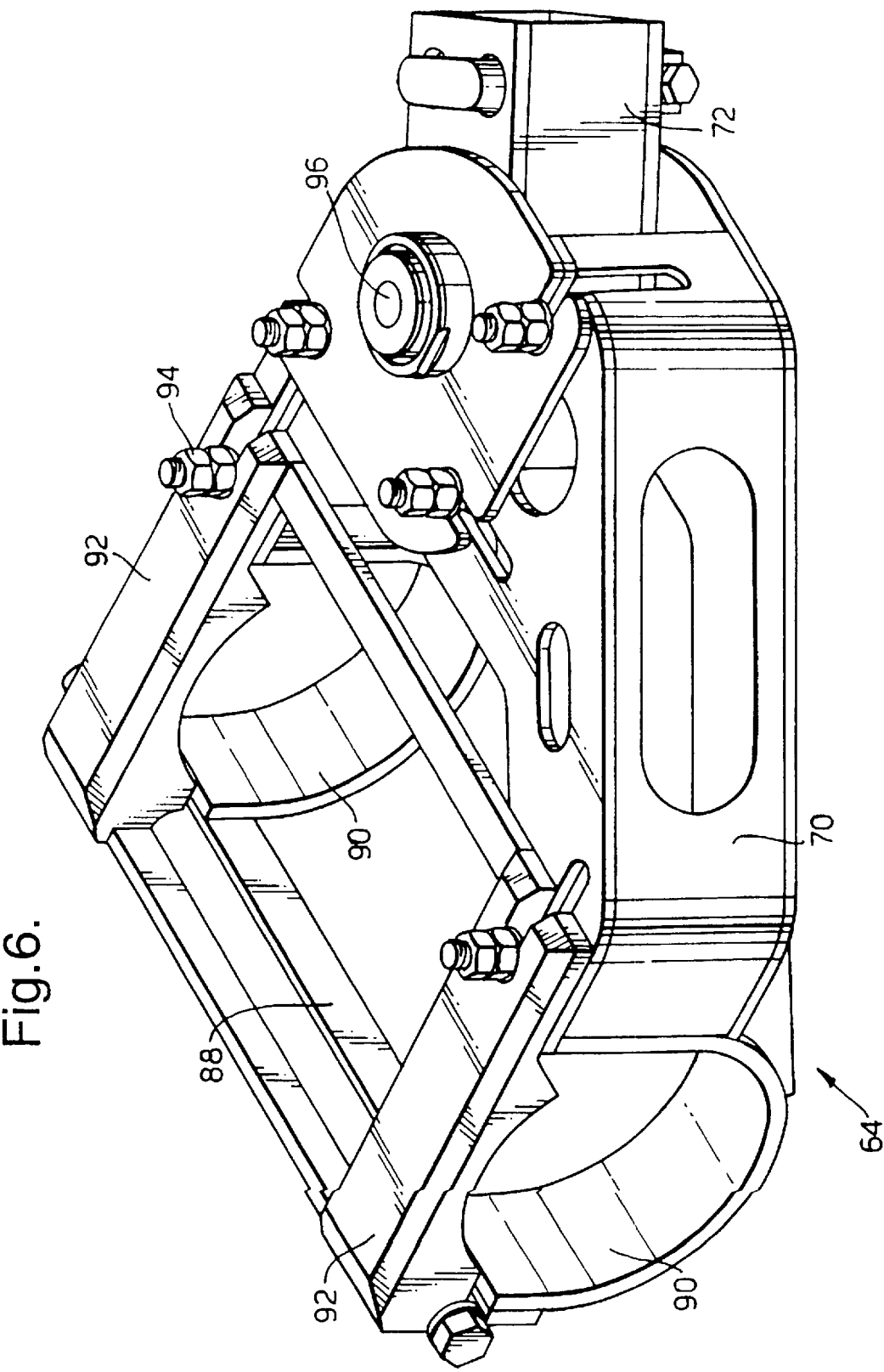

FIG. 6 shows the towing attachment based on the clamping member 64 in more detail, while FIG. 7 shows the clamping member 64 secured to the central portion 44a of the tubular body member 44. As can best be seen in FIG. 6, the clamping member 64 comprises a frame 88 defining a U-shaped channel member 90 for receiving the central portion 44a of the tubular body member 44. The frame 88 is provided with a clamping device 92 which pivots about an axis extending parallel to the axis of the portion 44a to close the U-shaped channel 90 and clamp the portion 44a therein, as shown in FIG. 7. The clamping device 92 is held in its closed position by lock-nuts 94, and is held sufficiently tightly to prevent rotation about the body member 44.

The lug 70 is generally triangular, hollow, and projects from one side of the frame 88, while the towing bracket 72 is pivotally connected to the lug 70 by means of a pin 96 extending between and secured to the upper and lower surfaces of the lug.

In operation, when it is desired to begin the seismic survey, the port and starboard outer streamers 14e are deployed over the stern of the vessel 10, and birds and position sensing devices are connected to them as appropriate in the usual way during deployment. As deployment proceeds, eventually the ends of the lead-ins 20 reach the stern of the vessel 10, whereupon the MONOWING deflectors 34 and their associated auxiliary deflector wings and floats are attached, again in the usual way, and deployment again continues. Simultaneously, deployment of the port and starboard streamers 14d commences.

When the tubular body members 44 of the connectors 26 of the lead-ins 20 reach the stern of the vessel 10, their towing attachments are attached, but deployment of the lead-ins 20 stops until the front ends of the streamers 14d reach the stern, whereupon these front ends are transferred by means of a transfer cable and connected to the connectors 26. Suitable drag-reducing fairings are then fitted over the connectors 26, and deployment continues yet again. Simultaneously, deployment of the port and starboard streamers 14c commences.

When the tubular body members 44 of the connectors 24 of the lead-ins 20 reach the stern of the vessel 10, their towing attachments are attached, but again, deployment of the lead-ins 20 stops until the front ends of the streamers 14c reach the stern of the vessel 10. At this point, the front ends of the streamers 14c are connected to the connectors 24 using a transfer cable as described above, suitable fairings are fitted to the connectors, and deployment continues until the lead-ins 20 and the streamers 14c, 14d and 14e are fully deployed.

An analogous procedure is then followed to deploy the lead-ins 18 and the streamers 14a and 14b, whereupon the array 12 is fully deployed.

Drag reducing fairings are also fitted to the lead-ins 18, 20 during their deployment.

Once the fully deployed array 12 has been set up by means of the MONOWING deflectors 28, 34 to have the required 160 meter streamer spacing, and airguns or other seismic sources have also been deployed, the survey commences and is carried out as described hereinbefore. After the survey is completed, the recovery of the seismic sources and the array 12 is carried out by effectively reversing the deployment sequence described in the preceding paragraphs.

The Applicant has determined that, as a result of towing more than one streamer from each lead-in in accordance with the present invention, the drag produced by the streamer array 12 is about 50 tonnes, which is a marked improvement on the over 70 tonnes drag that would be produced if each of the ten streamers were towed by a respective lead-in.

Many changes can be made to the described implementation of the invention.

For example, as shown in FIG. 8, the three inner streamers 14a, 14b, 14c can be connected to a single common lead-in 118, while the two outer streamers 14d, 14e can be connected to a single common lead-in 120.

Other changes which can be made include making the outer sheath 46 of the lead-ins 18, 20, 118, 120 from a high strength synthetic fibre such as Kevlar, in which case, because of the light weight of the Kevlar compared to steel, the floats 38, 40, 42 are unnecessary, and the aforementioned resin sockets are used to connect the sheath to the relevant connector device.

Also, at least some of the electrical conductors of the inner core, specifically those which carry control and signals data to and from the streamers 14, can be replaced with optical fibres, in which case the jumper cables 54, 58 (or their alternatives) also contain optical fibres, and the associated connectors are hybrid electro-optical connectors.

Additionally, the connectors 22, 24, 26 can include multiplexers for multiplexing the data signals from the streamers 14, in order to obviate the need for extra conductors in the parts of the lead-ins on the vessel-side of the connectors.

A particularly advantageous modification which can be made to the connector devices 22, 24, 26 comprises incorporating in the portion 49 of the tubular body member 44 of the connector device, ie on the side thereof associated with the outer lead-in part (part 18b for the connector device 22, part 20b for the connector device 24 and part 20c for the connector device 26), a screw connector for detachably connecting the outer lead-in part to the connector device. This permits outer lead-in parts of different lengths to be used to achieve different lateral streamer spacings, as desired. A similar screw connector can be included in portion 48 of the tubular body member 44 of the connector device if desired.

Although the preferred embodiment of the connector device 22 has two spaced apart universal joints to provide it with a certain degree of flexibility, in some applications, a single universal joint may be sufficient to provide the necessary flexibility, eg where the storage drums are not quite so small in diameter.

Finally, although the invention has been described in the context of a connector device for permitting two or more streamers to be towed from a single lead-in, a modified version of the connector device, in which the towing attachment based on the clamping device 64 and the towing bracket 72 is simply omitted, can be used to splice together two substantially identical lead-ins to produce a lead-in of increased length. This modified version of the connector device includes one or two universal joints as necessary, and is particularly useful for connecting together undamaged parts cut or otherwise derived from a damaged lead-in which would otherwise be unusable.

What is claimed is:

1. A method of performing a marine seismic survey with an array of seismic streamers towed behind a survey vessel, wherein two or more of the streamers are towed from a single lead-in which comprises a load-bearing outer sheath to bear the towing forces, an electrical or electro-optical core via which control signals and electrical power are supplied to, and data signals are received from, the streamers being towed by the lead-in, and a connector device series connected in the lead-in, the connector device comprising a body member mechanically coupled between the respective portions of the load-bearing outer sheath of the lead-in on either side thereof, to transmit towing forces therebetween, and a towing attachment for mechanical connection to one of the two or more streamers.

2. A method as claimed in claim 1, wherein the array comprises 2N streamers, where N is at least 2, the streamers are substantially uniformly spaced apart and symmetrically distributed on each side of the centre line of the vessel, and at least two streamers on each side of the centre line of the vessel are towed from a respective such lead-in.

3. An array of seismic streamers adapted to be towed behind a survey vessel, the array comprising at least one lead-in which has two or more of the streamers connected to be towed thereby, and which comprises a load-bearing outer sheath to bear the towing forces, an electrical or electro-optical core via which control signals and electrical power are supplied to, and data signals are received from, the streamers being towed by the lead-in, and a connector device series connected in the lead-in, the connector device comprising a body member mechanically coupled between the respective portions of the load-bearing outer sheath of the lead-in on either side thereof, to transmit towing forces therebetween, and a towing attachment for mechanical connection to one of the two or more streamers.

4. An array as claimed in claim 3, comprising 2N streamers, where N is at least 2, the streamers are substantially uniformly spaced apart and symmetrically distributed on each side of the centre line of the vessel, and at least two streamers on each side of the centre line of the vessel are towed from a respective such lead-in.

5. An array as claimed in claim 3, wherein the load-bearing outer sheath of the lead-in is made from high strength synthetic fibres.

6. An array as claimed in claim 5, wherein the high strength synthetic fibres are Kevlar fibres.

7. An array as claimed in claim 3, wherein the body member of the connector device comprises at least two generally tubular portions interconnected by a universal joint, the towing attachment being secured to one of the tubular body portions.

8. An array as claimed in claim 7, wherein the universal joint of the connector device is a Cardan-type universal joint.

9. An array as claimed in claim 3, wherein the body member of the connector device comprises three tubular body portions interconnected by two universal joints, the towing attachment being secured to the middle one of tubular body portions.

10. An array as claimed in claim 3, wherein the towing attachment of the connector device comprises clamping means for detachably clamping it to the tubular body portion to which it is secured.

11. An array as claimed in claim 3, wherein the towing attachment of the connector device has a towing bracket pivotally connected to it, said towing bracket being pivotal about an axis generally perpendicular to the axis of the body portion to which the towing attachment is secure.

12. An array as claimed in claim 3, wherein at least part of the body member of the connector device is made from titanium.

13. An array as claimed in claim 3, wherein the inner core of the lead-in at each end of the connector device is terminated in a respective watertight termination, and the connector device includes elongate flexible electrical or electro-optical connector means for establishing electrical or electro-optical connection between said watertight terminations and between one of said terminations and the streamer connected to the towing attachment.

14. An array as claimed in claim 13, wherein the watertight termination includes an electrical or electro-optical connector, and said elongate flexible connector means is adapted to connect to an disconnect from the respective one of said connectors.

15. An array as claimed in claim 3, wherein the inner core of the part of the single lead-in on the vessel side of each connector includes separate electrical conductors or optical fibers for the control and data signals of each streamer connected directly or indirectly to that part via tat connector.

16. A connector device adapted for series connection in a lead-in to permit the lead-in to tow at least two seismic streamers, the lead-in comprising a load-bearing outer sheath, to bear the towing forces, and an electrical or electro-optical core via which control signals and electrical power are supplied to, and data signals are received from, the streamers, the connector device comprising a body member adapted to be mechanically coupled between the respective portions of the load-bearing outer sheath of the lead-in on either side of the body member, to transmit towing forces therebetween, and a towing attachment for mechanical connection to one of the two or more streamers, said towing attachment being secured to the body member.

17. A connector device as claimed in claim 16, wherein the body member comprises at least two generally tubular portions interconnected by a universal joint, the towing attachment being secured to one of the tubular body portions.

18. A connector device as claimed in claim 17, wherein the universal joint is a Cardan-type universal joint.

19. A connector device as claimed in claim 16, wherein the body member comprises three tubular body portions interconnected by two universal joints, the towing attachment being secured to the middle one of tubular body portions.

20. A connector device as claimed in claim 19, wherein the towing attachment comprises clamping means for detachably clamping it to the body member.

21. A connector device as claimed in claim 20, wherein the towing attachment has a towing bracket pivotally connected to it, said towing bracket being pivotal about an axis generally perpendicular to the axis of the body member.

22. A connector device as claimed in any one of claim 16, wherein at least pat of the body member is made from titanium.

23. A connector device adapted for series connection in a lead-in used for towing a streamer, the lead-in comprising a load bearing outer sheath to bear the towing forces, and an electrical or electro-optical core via which control signals and electrical power are supplied to, and data signals are received from, the streamer, the connector device comprising a tubular body member which is adapted to be mechanically coupled between the respective portions of the load-bearing outer sheath of the lead-in on either side of the body member, to transmit towing forces therebetween, and which preferably comprises at least two generally tubular portions interconnected by a universal joint.

* * * * *